Oct. 30, 1934.                L. F. MOODY                1,978,809
                           HYDRAULIC APPARATUS
                           Filed May 26, 1931          3 Sheets-Sheet 1
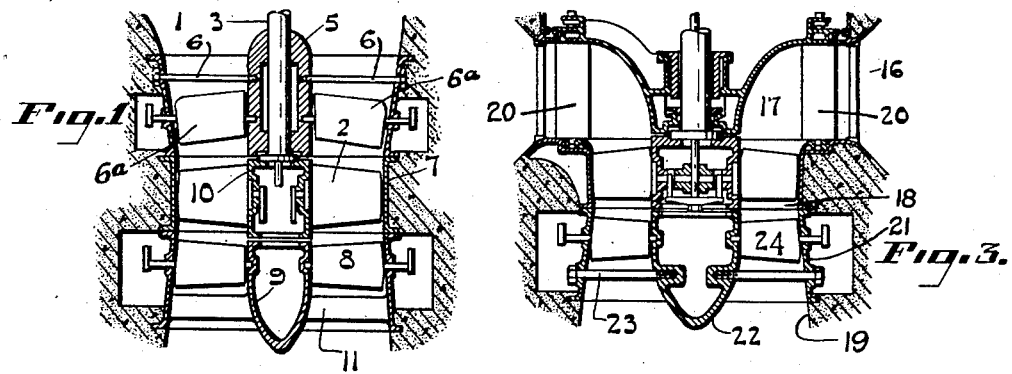
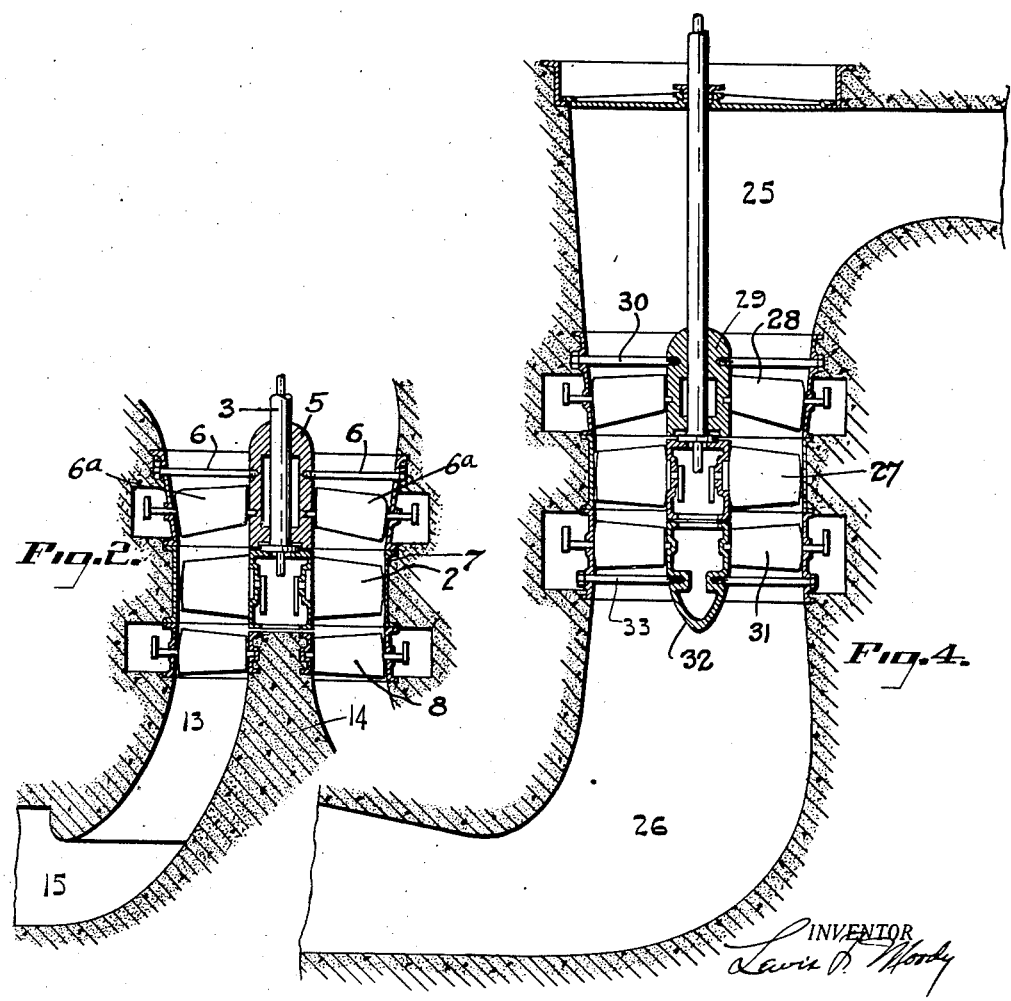

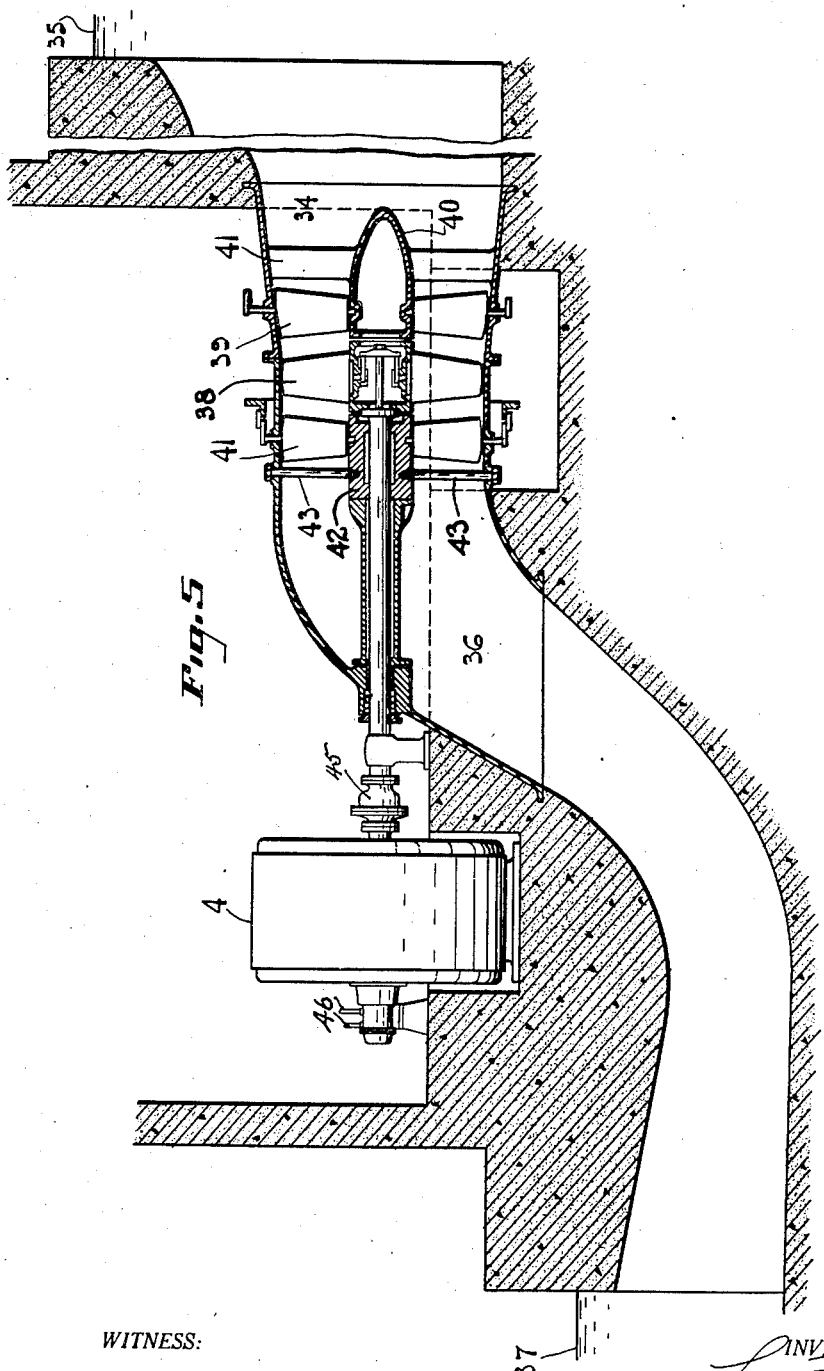

Oct. 30, 1934.   L. F. MOODY   1,978,809
HYDRAULIC APPARATUS
Filed May 26, 1931   3 Sheets-Sheet 3

INVENTOR
Lewis F. Moody
BY
ATTORNEY

Patented Oct. 30, 1934

1,978,809

UNITED STATES PATENT OFFICE 1,978,809

HYDRAULIC APPARATUS

Lewis Ferry Moody, Princeton, N. J.

Application May 26, 1931, Serial No. 540,137

10 Claims. (Cl. 253—96)

This invention relates to hydraulic machines and more particularly to a turbine, pump or pump-turbine especially of the high specific speed or propeller type.

Hydraulically reversible pump-turbines are particularly adapted for use in hydraulic power-accumulation systems, in which during off-peak periods of load demand the machine may pump water into the pond or reservoir by utilizing current supplied by other plants in the system; and may utilize the water so stored to carry peak loads by operating the machine as a turbine and thus supply current to the system. While my present invention is adapted to operate as a pump-turbine certain of its features are also applicable to a pump or turbine alone.

In attempting to use a single machine for both pump and turbine operations it is readily appreciated that not only must the design of the flow passages, runner blades and guide vanes be adapted to operate with flow in either direction but also the variable control of the flow must be such as not to create unnecessary disturbances in or destructive effects by the flow. It is very desirable to have a single machine for performing both functions providing reasonably good efficiency may be obtained for each function because the cost of one unit for performing both functions is materially less than the cost of two separate units each performing only one function due not only to the cost of the units themselves but also to the power house structure and conduits required. The use of only one unit will require less space in the power house and will reduce not only the initial cost of installation but maintenance and depreciation charges.

It is preferable that the machine as described herein have a constant direction of revolution of the rotor for pump and turbine operations although with certain modifications of my invention the rotor may be rotated in opposite directions for pump and turbine operations.

My invention involves adjustable runner blades and adjustable guide vanes disposed on each side of the runner. Arrangements are also provided wherein stay vanes are associated with the machine structure as above described. The runner blades are of the unshrouded type and of generally flat form in the direction of flow thereover although the blades may have a slight degree of curvature as is usual with high specific speed propeller type runners, the runner blades also being normally pitched forward to incline nearer to the tangential than to the axial direction. The area if the runner blades is such as to form either an open or closed type of runner, that is, in the closed type the aggregate actual area of the runner blades is at least equal to the cross-sectional area of the runner passage taken on a plane normal to the runner axis, or, when measured in another aspect the blade area is such that a line drawn normal to the flow, and extending from one edge of a blade, will intersect the adjacent blade at least along the major portion of the blade length. The open type runner is where such an intersection is effected over only a very small part of the blade length. It is preferable in relatively high head plants, for heads in excess of about fifty feet, to have a runner blade area substantially equal to the transverse area of the runner passage, measured in a plane normal to the runner axis, while in relatively low head plants the blade area may be materially less. The adjustable guide vanes above and below the runner may be adjusted for either direction of flow, thereby permitting the degree of whirl to be regulated at both entrance and discharge when operating either as a pump or turbine, thus insuring improved hydraulic conditions and method of power and flow control.

It is an object of my invention to provide improved arrangements as above described and to provide operating mechanism for the adjustable runner blades and guide vanes, the operating mechanism for the runner blades being any of the various types hereinafter referred to and likewise for the adjustable guide vanes. However, under certain conditions of operation the movable guide vanes may be arranged so as to be released from constraint by their controlling mechanism and thus be allowed to float so that they may automatically take up a position conforming to the flow. This is particularly applicable to the vanes below the runner when the unit is operating as a turbine so that the vanes disposed at the discharge side of the turbine runner may be released from positive control and permitted to take up a position conforming to the flow.

Other objects and advantages will be more apparent to those skilled in the art from the following description of the accompanying drawings, in which:

Fig. 1 is a vertical section showing the adjustable blade runner in combination with a lower set of adjustable guide vanes whose inner ends are journalled in a stationary central lower hub cap supported by stay vanes while a set of adjustable guide vanes are similarly supported on the upper side of the runner blades except that the upper hub cap is supported by stay bolts;

Fig. 2 is a combination similar to Fig. 1 except that the lower guide vanes are journalled in the cone of a spreading type draft tube;

Fig. 3 is a vertical section of a setting having a flow passage turning from radial to axial with adjustable guide vanes disposed in the radial portion of the passage and adjustable guide vanes disposed below the runner in the axial portion of the passage;

Fig. 4 is a vertical section showing an elbow passage for both the inlet and discharge passages with adjustable guide vanes disposed above and below the adjustable runner blades, the guide vanes being supported in housings held by stay bolts;

Fig. 5 is a vertical section of a horizontal setting wherein adjustable guide vanes are disposed on each side of the adjustable runner blades, one set of the adjustable guide vanes being journalled in a cap which is supported by stay vanes while a similar cap for the other set of guide vanes is supported by stay bolts;

Figure 6:
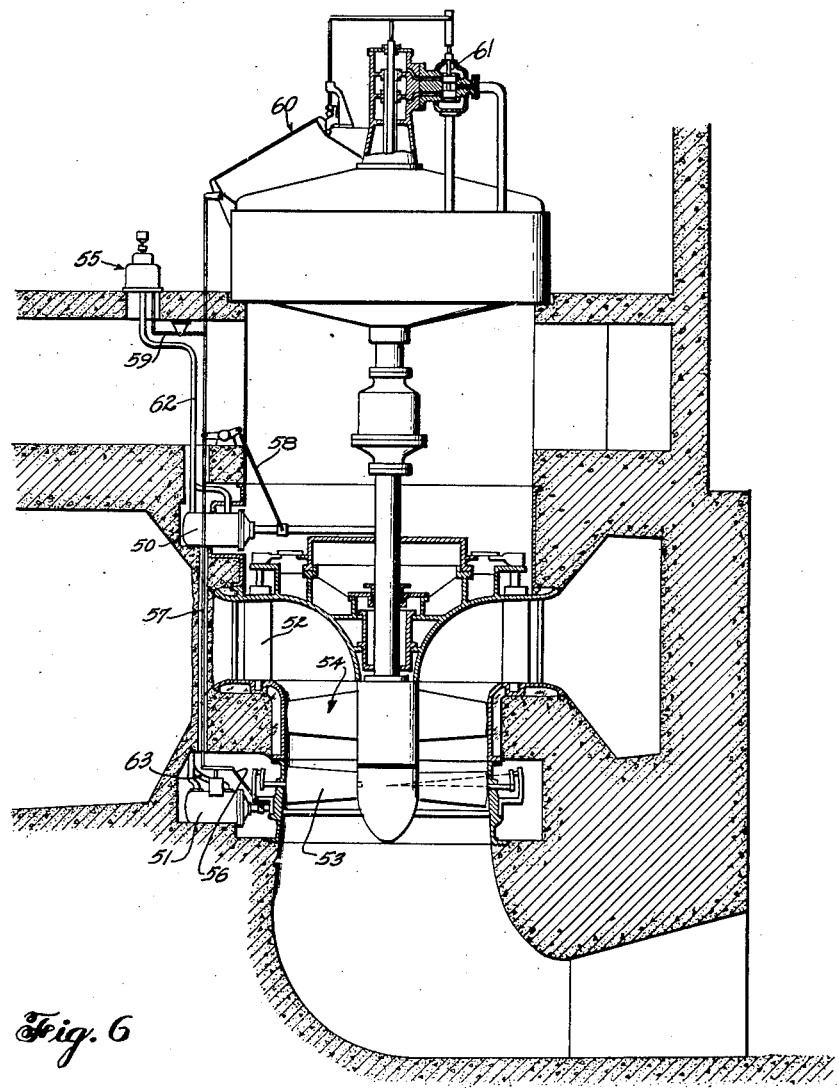
Fig. 6 is a vertical sectional view of a turbine embodying improved features of my invention and disclosing means for actuating the adjustable guide vanes on each side of the adjustable runner blades.

In the illustrative embodiment of my invention I have shown in Fig. 1 a machine having a passage 1 leading from the headwater, the passage being of relatively gradual taper formation as it approaches the runner 2. The runner is of the adjustable blade type as previously mentioned wherein the blades are specifically shown herein are adjustable about axes normal to the runner axis although if desired the blades can be adjustable about inclined axes as shown in my Patent No. 1,837,568. The runner is supported upon a hollow shaft 3 through which a suitable operating rod may extend for adjusting the blades such as shown in said patent above mentioned. The particular form of the operating mechanism does not specifically constitute a part of this invention other than in its broad aspect and hence a detailed description and disclosure of such operating mechanism is not necessary here. The shaft 3 is connected to a generator, motor or generator-motor depending upon the particular mode of operation of the machine. Such an electrical machine is diagrammatically indicated in Fig. 5 at 4. The rotor shaft 3 is journalled in an upper bearing housing or cap 5 supported by stay bolts 6 while adjustable guide vanes 6a are journaled in housing 5 and pasage wall 7.

The portion of the flow passage immediately adjacent the runner 2 is cylindrical and as specifically shown is without any taper. The portion of the passage immediately below the runner is preferably of a gradually tapering formation so as to perform efficiently the draft tube functions when the machine operates as a turbine. Disposed in this lower portion are adjustable guide vanes 8 supported at their outer ends in the wall of the passage while their inner ends are supported in a stationary conical cap 9 which forms a continuation of the contour of the runner hub 10, it being understood of course that the bearing housing 5, runner hub 10, cap 9 and passage wall are preferably circular in cross-section so as to provide a smooth fluid passageway throughout. The cap 8 is supported by stay vanes 11 which extend vertically so as to be able to cooperate equally effectively with flow in either direction.

The operating mechanism for the adjustable guide vanes 8 is of any suitable type such as disclosed in my Patent No. 1,460,428, but as the details of structure and operation of such mechanism do not specifically enter into my present invention the same is not shown or described in detail. The adjustable guide vanes 8 and runner blades are adjusted so as to be relatively inclined to effect either pump or turbine operation as desired.

In the Fig. 2 form the general arrangement is the same as in Fig. 1 except that the flow passage below the runner is in the form of a spreading type draft tube 13. Corresponding parts of Figs. 1 and 2 are given the same reference numbers. The draft tube has a central core 14 forming the spreading annular passage which discharges into a collector passage 15 as is usual with this type of draft tube. It is of course to be understood that, in all of the arrangements shown, for interchangeable pump and turbine operation the passages leading to and from the runners are designed to effect relatively low rates of change in velocity, thereby being conducive to the most efficient deceleration of the discharge from the runner during either pump or turbine operation.

In the Fig. 3 form there is provided a radial inlet 16 which turns through a transition space 17 to an axial passage 18, this axial passage terminating in a gradually flaring passage 19 which may be in the form of a draft tube of either the elbow or spreading types. Adjustable guide vanes or wicket gates 20 are provided in the radial portion of the passage, these guide vanes being adjustable by any usual shifting ring and connecting links. The ring 21 has blades adjustably actuated by suitable mechanism as previously mentioned. A stationary conical cap 22 also forming a continuation of the runner hub is supported by stay bolts 23. The inner ends of lower adjustable guide vanes are supported in said cap while the outer ends are journalled in the draft tube liner. These lower guide vanes are actuated by suitable mechanism as previously mentioned.

In the Fig. 4 form the passages 25 and 26 leading respectively upwardly and downwardly from the runner 27 are each of elbow formation. The runner has blades adjusted as previously mentioned while upper adjustable guide vanes 28 are supported for adjustment about radial axes and supported at their inner ends by a bearing housing 29. This housing in turn is supported by stay bolts 30. A lower set of adjustable guide vanes 31 are journalled in a stationary conical cap 32 supported by stay bolts 33.

In the Fig. 5 form the passage 34 leads directly to the headwater 35 while a passage 36 leads gradually downwardly to the tailwater 37. Both of these passages effect relatively gradual changes in the flow velocity so as to insure proper diffusing action during pump or turbine operation. The runner 38 is of the adjustable blade type and disposed preferably in a straight portion of a passage, the adjustable actuating mechanism being of the same nature as previously mentioned for the other forms. A set of adjustable guide vanes 39 is provided on one side of the runner and said vanes have their inner ends journalled in a stationary conical cap 40 supported by stay vanes 41, these stay vanes extending axially of the runner axis with suitable inclination and curvature so as to cooperate with the flow in either direction thereof. The outer ends of the adjustable guide vanes 39 are supported in the passage wall for simultaneous operation. Another set of adjustable guide vanes 41 has the inner ends of the vanes journaled in a bearing housing 42 which is supported by stay bolts 43 while the outer ends of the guide vanes 41 are journalled in the passage wall and simultaneously actuated by suitable mechanism. The runner blades are adjusted by mechanism including a reciprocating rod extending through the hollow runner shaft and connected to a double acting fluid operated piston within a cylinder 45 formed as part of the shaft. Fluid supply and discharge passages extend through the armature shaft and terminate in suitable control pipes 46.

In the arrangements where adjustable guide vanes are provided on each side of the runner it will be seen that the motor-generator may have uni-directional rotation for both pump and turbine operation, this being possible due to the two sets of guide vanes and runner blades being oppositely adjustable for flow conditions in either direction. Although as previously mentioned one set of guide vanes, for instance the guide vanes 41, Fig. 5, or the lower set of guide vanes in the other forms during turbine operation and the upper set during pump operation, may be disconnected from their actuating connection and thus be permitted to conform automatically to the flow lines, this mode of operation being applicable to a unit having either reversible or uni-directional rotation.

It will be preferable in pump-turbine units to provide means for adjusting the interconnection between the guide vanes below the runner and the operating mechanism for the other vanes, so that the lower guide vanes may be positively set for a different range of positions during pump operation from their positions during turbine operation. This can be effected by providing separate operating motors 50 and 51 for actuating respectively an upper set of adjustable guide vanes 52 and a lower set of adjustable guide vanes 53 disposed on each side of an adjustable blade runner 54 as shown in Fig. 6. The motors 50 and 51 are actuated by pressure fluid supplied from any suitable source and controlled by a governor diagrammatically indicated at 55. The motors are interconnected through suitable restoring mechanism generally indicated at 56, link 57 and restoring mechanism 58. This linkage arrangement controls a usual governor pilot valve as through linkages 59 and is also interconnected with the runner blades through linkages 60 and a pilot valve 61. The linkages 60 and pilot valve 61 do not form a part of my present invention but are illustrated merely to complete the general overall picture of a usual form of turbine control. Fluid pressure is supplied to each of the servo-motors 50 and 51 as through pipes 62 and 63. By adjusting the relative initial positions of the servo-motors 50 and 51, the upper and lower sets of guide vanes may be set for different range of positions as above described.

When the unit in the various forms shown is operated as a turbine, it is necessary to have inclined guide vanes at entrance to the runner to provide an efficient means for regulating the power and speed of the unit. At the same time it is also desirable to have adjustable runner blades in order to secure the most efficient angle for each guide vane opening. When, however, the unit is reversed and acts as a pump, with reversed direction of flow, the control of the quantity discharged cannot be efficiently accomplished by adjustable guide vanes on the discharge side of the runner alone, or even with adjustable runner blades, or a combination of the two adjustments. When the guide vanes at discharge from the runner are partially closed to reduce the discharge and power consumption, this causes a throttling action and it is not possible to avoid a sudden enlargement of section and corresponding sudden reduction of velocity in the flow leaving the guide vanes. Much more efficient operation and control may be secured by providing a set of guide vanes in advance of the runner when operating as a pump. In general, in a reversible pump-turbine machine such as described, unless means are provided for controlling the amount of flow in either direction, the power consumption when operating as a pump will be much in excess of its generating capacity when operating as a turbine so that without an efficient means of adjustment and control of the amount of flow the generator-motor (unless of variable speed type) will be either overloaded when driving the unit as a pump, or only partially loaded and of excess capacity for turbine operation. In the device here shown in various embodiments, efficient means are provided for regulating the flow when the unit is pumping, as well as when generating power. The control for pump operation is accomplished primarily by a partial closure of the guide vanes at entrance to the runner. When these vanes are turned toward a tangential inclination, they reduce the area of flow cross-section and thereby increase the velocity; and at the same time they direct this velocity with a substantial tangential component, creating a whirling mass of water prior to entrance into the runner. The whirl thus set up delivers kinetic energy to the runner due to its rotation being in the same direction as that of the runner; and this action conserves energy by permitting the runner to utilize the increased velocity of flow instead of throwing away, or inefficiently diffusing, this velocity energy as at discharge from vanes placed on the discharge side of the runner. The effect of the adjustable entrance vanes is to reduce the torque on the shaft during pump operation.

With the ability to adjust all three sets of vanes, as in Figs. 3 and 4, namely the runner blades and guide vanes at both entrance and discharge, the most efficient combination of the angles of all three sets may be obtained at every rate of discharge, for either pump or turbine operation. In general the angles will be adjusted so that the flow areas will be approximately proportional in the three sets of vanes. All three sets of vanes will be adjusted together so as to approach the tangential or closed position at substantially the same time. Relatively small variations from proportional angular movements may be provided depending upon the exact characteristics of a particular design. A usual arrangement will be to interconnect the operating mechanisms to preserve the proper angular relations, this being accomplished by utilizing the two servo-motors 50 and 51 interconnected through linkages 56, 57 and 58 as shown in Fig. 6. It will generally be preferable to actuate the various sets independently, employing only one set, such as the entrance guide vanes during turbine operation for quick regulations, and permitting a slower motion for the other sets; but means should be provided for bringing the final angles after the quick adjustment is completed, into proper relation. This may be accomplished by suitable attachments to the governor or adjusting motors, such as shown in my Patent No. 1,872,165.

When a propeller turbine is operating at its point of best efficiency the direction of discharge from the runner blades should not be axial but should contain a tangential or whirl component in order to secure the minimum possible value of the aggregate losses within and at discharge from the runner. With guide vanes on the discharge side of the runner, these vanes in normal load position should therefore be inclined to a certain extent with reference to the axial direction, in order to conform to the most efficient direction of flow. Under part load operation the whirl component of the discharge velocity from the runner increases to a limited degree with adjustable runner blades. When the directions of runner rotation and flow are reversed in a reversible pump-turbine, it is desirable, as pointed out above, to operate at a reduced discharge in order to avoid overloading the driving motor or to limit, as far as is consistent with high efficiency, the power demand on the motor. This consideration together with the change in hydraulic conditions involved in the reversed operation, calls for the pumping operation to be carried out at reduced openings of the guide vanes at entrance to the turbine runner (now at discharge from the pump runner) below the opening corresponding to normal turbine operation. This results in flow conditions below the runner (correspond to discharge as a turbine) which are similar to part-gate turbine operation, although all the velocities are reversed in direction. Hence the guide vanes below the runner should be set to a greater angle of inclination to the axial direction to suit pump operation than their normal angle for turbine operation. These vanes will at the same time improve the efficiency of pump operation by directing the water in a definite predetermined manner and by directing it so as to provide a preliminary whirl in the same direction as the runner rotation, thereby securing the most favorable velocity conditions and minimizing the hydraulic losses. Moreover, these vanes further provide an efficient means of regulating the discharge of the pump, as explained above.

It will of course be understood that various changes may be made in the arrangement and construction of parts without departing from the spirit of the invention as set forth in the appended claims.

I claim:

1. A hydraulic pump-turbine comprising a runner having uni-directional rotation for both pump and turbine operation, and having blades adjustable to one direction of inclination for pump operation and in the opposite direction for turbine operation, a passage leading to and from said runner, and sets of adjustable guide vanes disposed on opposite sides of said runner, whereby during one mode of operation the guide vanes on one side of the runner control the direction of flow to the runner and simultaneously the guide vanes on the other side control the flow received from the runner, and vice versa during the other mode of operation.

2. A hydraulic pump-turbine adapted to have a constant direction of rotation throughout operation comprising a runner having blades adjustable to one direction of inclination for pump operation and in the opposite direction for turbine operation, a passage leading to and from said runner, and sets of adjustable guide vanes disposed on opposite sides thereof, one set of guide vanes having provision whereby they may substantially freely conform to the flow lines, whereby during one mode of operation the guide vanes on one side of the runner control the direction of flow to the runner and simultaneously the guide vanes on the other side control the flow received from the runner, and vice versa during the other mode of operation.

3. A hydraulic pump-turbine adapted to have a constant direction of rotation throughout operation comprising a runner having blades adjustable to one direction of inclination for pump operation and in the opposite direction for turbine operation, a passage leading to and from said runner, sets of adjustable guide vanes disposed on opposite sides thereof, one set of guide vanes having provision whereby they may substantially freely conform to the flow lines, and means for adjusting the other set of guide vanes and positively holding the same in any adjusted position, whereby during one mode of operation the guide vanes on one side of the runner control the direction of flow to the runner and simultaneously the guide vanes on the other side control the flow received from the runner, and vice versa during the other mode of operation.

4. A hydraulic pump-turbine comprising a runner having a constant direction of rotation for pump and turbine operation and having a hub carrying blades adjustable to one direction of inclination for pump operation and in the opposite direction for turbine operation, a passage leading to and from said runner, and sets of adjustable guide vanes disposed on each side of said runner and spaced therefrom to provide a transition space on each side of said runner, the guide vanes on each side having provision for being adjustable, whereby during one mode of operation the guide vanes on one side of the runner control the direction of flow to the runner and simultaneously the guide vanes on the other side control the flow received from the runner, and vice versa during the other mode of operation.

5. A hydraulic pump-turbine comprising a runner having a constant direction of rotation for pump and turbine operation and having a hub carrying blades adjustable to one direction of inclination for pump operation and in the opposite direction for turbine operation, a passage leading to and from said runner, sets of adjustable guide vanes disposed on each side of said runner, and means for supporting one set of said guide vanes including a member whose contour substantially constitutes a continuation of the contour of the runner hub, whereby during one mode of operation the guide vanes on one side of the runner control the direction of flow to the runner and simultaneously the guide vanes on the other side control the flow received from the runner, and vice versa during the other mode of operation.

6. A hydraulic pump-turbine comprising a runner having a constant direction of rotation for pump and turbine operation and having a hub carrying blades adjustable to one direction of inclination for pump operation and in the opposite direction for turbine operation, a passage leading to and from said runner, sets of adjustable guide vanes disposed on each side of said runner, means for supporting one set of said guide vanes including a member whose contour substantially constitutes a continuation of the contour of the runner hub, and means whereby said member is held in suspended position and supported by the wall of said passage, whereby during one mode of operation the guide vanes on one side of the runner control the direction of flow to the runner and simultaneously the guide vanes on the other side control the flow received from the runner, and vice versa during the other mode of operation.

7. A hydraulic pump-turbine comprising a runner having a constant direction of rotation for pump and turbine operation and having a hub carrying blades adjustable to one direction of inclination for pump operation and in the opposite direction for turbine operation, a passage leading to and from said runner, sets of adjustable guide vanes disposed on each side of said runner, and means for supporting one set of said guide vanes including a member whose contour substantially constitutes a continuation of the contour of the runner hub, said member constituting a portion of a cone disposed in said passage on one side of said runner, whereby during one mode of operation the guide vanes on one side of the runner control the direction of flow to the runner and simultaneously the guide vanes on the other side control the flow received from the runner, and vice versa during the other mode of operation.

8. A hydraulic pump-turbine comprising a runner having a constant direction of rotation for pump and turbine operation and having a hub carrying blades adjustable to one direction of inclination for pump operation and in the opposite direction for turbine operation, a passage leading to and from said runner, cap-like members disposed immediately above and below the runner hub, and sets of adjustable guide vanes disposed on each side of said runner and supported in said cap-like members, whereby during one mode of operation the guide vanes on one side of the runner control the direction of flow to the runner and simultaneously the guide vanes on the other side control the flow received from the runner, and vice versa during the other mode of operation.

9. The combination in a hydraulic turbine comprising a runner with rotatably adjustable blades for altering the blade angles at entrance and discharge, adjustable guide vanes in advance of said runner, and adjustable guide vanes at discharge from said runner, each of said sets of guide vanes being simultaneously operative to control the inflow to and discharge from said runner and spaced therefrom to provide transition spaces, and draft tube means for gradually and efficiently decelerating the discharge from said adjustable guide vanes, whereby the guide vanes in advance of the runner direct the flow thereto and the guide vanes at discharge from the runner conform to and control the flow received from the runner in any adjusted position of said runner blades.

10. The combination in a rotary hydraulic machine comprising adjustable runner vanes and sets of adjustable guide vanes on each side of said runner, and means for effecting relatively quick adjustment of one set of vanes and slow adjustment for the other set, whereby during one mode of operation the guide vanes on one side of the runner control the direction of flow to the runner and simultaneously the guide vanes on the other side control the flow received from the runner, and vice versa during the other mode of operation.

LEWIS FERRY MOODY.